United States Patent [19]

Serbent, deceased

[11] Patent Number: 4,846,083
[45] Date of Patent: Jul. 11, 1989

[54] METHOD OF PROCESSING CONTAMINATED MINERAL SUBSTANCES

[75] Inventor: Harry Serbent, deceased, late of Hanau, Fed. Rep. of Germany, by Doris Serbent, heiress

[73] Assignee: Metallgesellschaft Aktiengesellschaft, Frankfurt am Main, Fed. Rep. of Germany

[21] Appl. No.: 196,995

[22] Filed: May 20, 1988

[30] Foreign Application Priority Data

Jun. 4, 1987 [DE] Fed. Rep. of Germany ....... 3718669

[51] Int. Cl.⁴ ............................................. F23G 5/00
[52] U.S. Cl. .................................. 110/344; 110/226; 110/246; 432/14; 432/111
[58] Field of Search .............. 110/246, 226, 346; 432/14, 105, 111

[56] References Cited

U.S. PATENT DOCUMENTS

| 4,640,681 | 2/1987 | Steinbiss et al. | 432/14 |
| 4,746,290 | 5/1988 | DeCieco et al. | 432/111 X |
| 4,750,436 | 6/1988 | Maury et al. | 110/346 |
| 4,751,887 | 6/1988 | Terry et al. | 110/246 |

Primary Examiner—Edward G. Favors
Attorney, Agent, or Firm—Sprung Horn Kramer & Woods

[57] ABSTRACT

For the production of a product which can be dumped or utilized, the mineral substances are subjected in a rotary kiln to a thermal treatment at a temperature at which the charge of the rotary kiln is transformed to a pasty to liquid slag phase. The composition of the charge is so selected that a slag phase is produced in which the main components, which constitute a matrix, are in the range from 60 to 72% $SiO_2$, 10 to 30% $Al_2O_3$ and 5 to 25% $CaO+MgO$, of said matrix, wherein the total percentage of $SiO_2+Al_2O_3+CaO+MgO$ equals 100, the total of the main components $SiO_2$, $Al_2O_3$, $CaO$ and $MgO$ amounts to more than 60% on a dry and ignition loss-free basis, of the mineral matter which is charged to the rotary kiln. The slag phase discharged from the rotary kiln is cooled and the exhaust gas from the rotary kiln is purified.

10 Claims, 1 Drawing Sheet

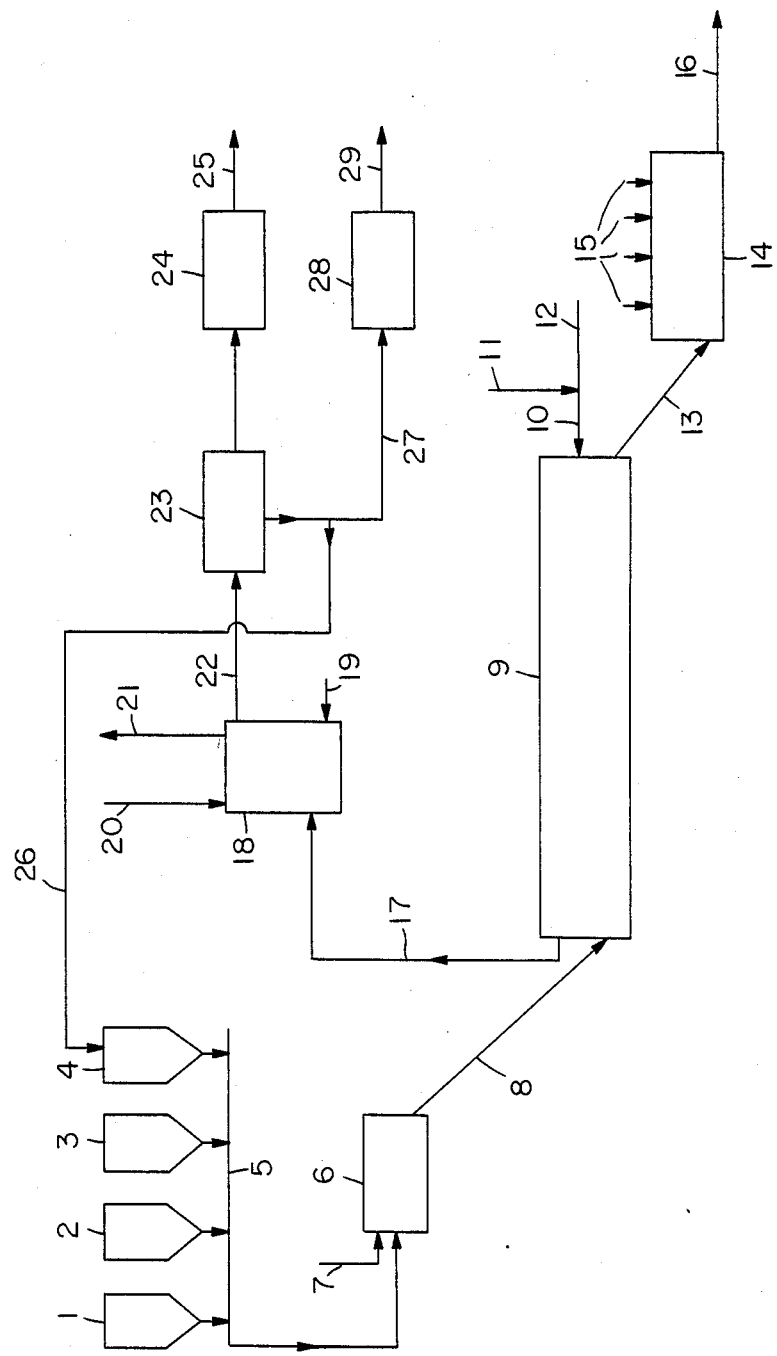

METHOD OF PROCESSING CONTAMINATED MINERAL SUBSTANCES

This invention relates to a method of processing contaminated mineral substances by a thermal treatment in a rotary kiln.

The decontamination of contaminated mixtures of mineral substances and the transformation of such mixtures to harmless materials, which can be dumped without difficulty or can be used for other purposes, is an important object from the aspect of environmental protection in the future.

The term "contaminated mixtures of mineral substances" covers substances which substantially consist of silica, alumina, lime and magnesia and which are contaminated so that they cannot readily be dumped or used for other purposes but normally must be transported to dumps for hazardous wastes at a considerable expense and must be dumped there. Expensive precautions must be adopted, e.g., in order to avoid a contamination of underground water.

The great variety of said substances will be illustrated by a few examples:

Sludges from gas-producing factories, coke oven plants, clarifiers and metal-working plants and from various fields of organic and inorganic chemistry and metallurgy, muds and sludges, contaminated bleaching earth, foundry residues, soils coming from industrial sites and contaminated with hydrocarbons, oils, greases, dyestuffs, solvents, chemicals and non-ferrous metal compounds etc., also materials from old dumps and polluant concentrates from soil-washing plants.

The contaminations contained in such substances can be classified as:

Organic components comprising:

hydrocarbons of any kind, their derivatives, particularly their halogen compounds, greases, oils, other combustibles, etc; and inorganic components comprising:

heavy metals, such as Cr, Ni, Cu, Zn, Pb, Cd, Hg etc. and their compounds, ammonia, cyanine compounds but also As and Sb.

Wet processes of separating such substances, e.g., by leaching and extraction, have always only a selective action and require a complete purification of the sewage.

Thermal processing methods have been proposed as an alternative which is more favorable in numerous cases. In such methods, organic components are combusted and/or decomposed, e.g., in a rotary kiln, and the end products are removed in an exhaust gas which must then be treated as required. In that case, certain heavy metal components, such as Hg and, under certain conditions, also Zn, Pb and Cd, may be volatilized and must then be separated from the exhaust gas.

British Patent Specification No. 1,336,712 discloses that $SiO_2$-containing waste materials which contain at least 30% $SiO_2$, such as powderized blast furnace slag, cupola slag or dredger muds, having a particle size below 1 mm and preferably below 0.256 mm, can be sintered at temperatures which exceed 1000° C. but are below the melting point at least of the majority of the powdered waste materials. But in that processing the problems involved in the heavy metals which remain in the residue are not taken into account. Part of their compounds are merely solubilized so that they may be leached out by water and humic acids.

EP-A-O No. 170,212 describes a process of producing agglomerates from sewage, dusts or sludges from industrial or municipal purifying plants in cases in which the agglomerates even when they have been disintegrated must be entirely inert to a leaching. To that end said substances must be homogenized with 30 to 99% clay in highly expensive mixing processes and must subsequently be granulated and then be thermally treated in a rotary kiln at temperatures between 700° and 1300° C. For a production of foamed agglomerates the granules contain 99 to 80% clay and are thermally treated at temperatures between 1000° and 1300° C. For a production of unfoamed agglomerates the granules contain 30 to 80% clay and are treated at temperatures between 700° and 1100° C. In that process the bulk of the waste materials is greatly increased and said large bulk must be subjected to the thermal treatment.

It is an object of the invention to avoid the disadvantages of the known processes and to transform the contaminated mineral substances in a simple manner into a form in which they can safely be dumped or used for other purposes.

That object is accomplished in accordance with the invention in that the thermal treatment is effected at a temperature at which the charge of the rotary kiln is transformed to a (pasty doughlike) to liquid slag phase, and the composition of the charge is so selected that a slag phase is produced in which the main components, which constitute a matrix, are in the range from 60 to 72% $SiO_2$, 10 to 30% $Al_2O_3$ and 5 to 25% $CaO+MgO$, of said matrix, wherein the total percentage of $SiO_2+Al_2O_3+CaO+MgO$ equals 100, the total of the main components $SiO_2$, $Al_2O_3$, CaO and MgO amounts to more than 60%, on a dry and ignition loss-free basis, of the mineral matter which is charged to the rotary kiln, the slag phase discharged from the rotary kiln is cooled and the exhaust gas from the rotary kiln is purified.

The rotary kiln is operated with the charge and the kiln atmosphere in countercurrent contact. The energy that is required for the thermal treatment may be supplied by hazardous materials which contain combustibles and which can also be dumped only at considerable costs and with difficulty. Such materials are, e.g., washery refuse, coal sludges, retort residues, oil- and grease-containing residues, waste oil, plastic chips, waste rubber chips, shredder refuse, etc. Residual energy deficits may be compensated by coals of any kind, from anthracite to brown coal, particularly coals having relatively high contents of ash and volatiles. If such substances or coals are added their compensation must be selected with a view to the required ratio of $SiO_2$ to $Al_2O_3$ to $CaO+MgO$ in the charge. The remaining energy deficit is compensated by means of a central burner, which is provided at the discharge end of the rotary kiln and which is operated with a supply of more or less fuel, as required, and may be used only to supply air. The central burner may be operated with pulverized coal, oil or gas. That air which is required for the process and is not supplied through the central burner is sucked into the rotary kiln at its discharge end. The kiln atmosphere in the free space of the kiln is oxidizing. Reducing conditions may be provided in the charge if the charge contains carbonaceous components which could be combusted to form CO. But a strongly reducing atmosphere in the charge is not required. The content of combustibles in the charge is so selected that said contents will be combusted in the kiln as completely as possible and there will be no surplus entering the slag phase. In the processing of some materials the required composition of the matrix of the slag phase may inherently have the required composition, possibly after an addition of coal or substances which contain combustibles. Otherwise that required composition can easily be adjusted by a mixing of various materials having different compositions. Mixing may be effected, e.g., in a drum and may be combined with a moistening so that a raising of a large amount of dust as the mixture is charged to the rotary kiln will be avoided. The mixture need not be pelletized or sintered before it is charged. The contaminated mineral substances may be supplied as a sludge or paste or as solids. The percentages of the main components of the matrix are stated in percent by weight. In the calculation of the ratio of the matrix of the slag phase to the entire slag phase the moisture and the ignition loss (hydration water, carbon dioxide and combustibles) are deducted. The term "combustibles" covers carbon, hydrocarbons, oils, greases, tars introduced by the mineral substances, as well as coal and their volatiles, etc.. The difference between the entire slag phase and the matrix of the slag phase is not in excess of 40% and may comprise components such as iron oxides, alkalies, titanium dioxide, sulfates, etc.. The temperature which is required in the final portion of the rotary kiln for the production of a (pasty doughlike) to liquid slag phase will depend on the selected composition within the ranges in accordance with the invention. The melting behavior will also be influenced by the additional components of the slag, such as FeO, alkalies, $TiO_2$ etc.. The required temperature can be empirically determined. The slag which has been discharged from the rotary kiln is cooled and may then be transported to a location of further use or to a dump. The combustible or volatilizable components contained in the charge are mainly expelled before the slag-forming zone and withdrawn from the kiln in the exhaust gas. The exhaust gas is purified by known processes, which will be selected in dependence on the contents and nature of the impurities.

DESCRIPTION OF THE DRAWING

The FIGURE is a schematic flowsheet of an example of the invention.

Decontaminated mineral substances are stored in bins 1 and 2, waste rubber chips are stored in bin 3 and recycled dust is stored in bin 4. The materials are discharged on conveyor 5 and introduced into drum mixer 6. Water 7 is added for moistening the mixture. The mixture is charged via line 8 into the rotary kiln 9 which is equipped with a central burner 10 at the discharge end which is fed with air 11 and oil 12. The discharged material is fed via line 13 into a cooling drum 14 which is sprayed with water 15. The cooled material in slag sand-like form is conveyed via line 16 for further use or deposition. The waste gas from rotary kiln 9 is fed by conduit 17 into afterburning chamber 18 which is supplied with air 19. Afterburning chamber 18 is equipped with tubes (not shown) into which water 20 is fed by conduit 22 into dust separator 23 and then into purification step 24. The cleaned waste gas is discharged by conduit 25. Separated dust is recycled via line 26 into bin 4. Part of the separated dust is conveyed via line 27 into treating station 28 in which Pb and Zn are recovered and discharged via 29.

DESCRIPTION OF THE PREFERRED EMBODIMENTS

In accordance with a preferred feature, the total of the main components $SiO_2$, $Al_2O_3$, CaO and MgO amounts to at least 70%, on a dry and ignition loss-free basis, of the mineral matter which is charged to the rotary kiln. The remaining pollutants will be particularly effectively included in the vitreous slag if the matrix amounts to at least 70% of the entire slag phase.

In accordance with a preferred feature the charge is heated in the rotary kiln to a temperature between 1150° and 1400° C. A good vitreous slag phase, which will reliably include the pollutants, will be formed at temperatures in that range.

In accordance with a preferred feature the substances to be charged to the rotary kiln have particle sizes up to 10 mm, preferably up to 5 mm. That particle size will result in particularly good operating conditions.

In accordance with a preferred feature, carbon-containing substances which can be dumped only with difficulty are used as energy sources. In that case a plurality of waste materials can be used and the costs of producing energy can be reduced.

In accordance with a preferred feature the hot slag is sprayed with water in a cooling drum or is introduced into a water bath and a slag sand-like product is produced. This will result in a simple manner in a cooling and a simultaneous disintegration of the slag.

In accordance with a preferred feature the hot slag is fed onto a slag belt conveyor and slag bricks are produced. This will result in a simple manner in a cooling and simultaneous shaping of the slag.

In accordance with a preferred feature a controlled combustion of the exhaust gas from the rotary kiln is effected in an afterburning chamber which succeeds the exhaust gas outlet of the rotary kiln. The exhaust gas leaving the rotary kiln is at a temperature between about 700° and 900° C. and in most cases contains gaseous, vaporous or fine-grained solid combustibles. Said components are combusted in the afterburning chamber in that the exhaust gas temperature is increased up to about 1200° C. If the exhaust gas is not inflammable, an additional heater may be provided. Alternatively, the exhaust gas can be rendered inflammable by a supply of suitable substances, such as brown coal, to the rotary kiln because in that case a part of the volatile combustibles which have been expelled at relatively low temperatures in the charge and are contained in the exhaust gas leaving the rotary kiln will not yet have been consumed. The pollutant content of the exhaust gases will be substantially eliminated by that afterburning.

In accordance with a preferred feature the afterburning chamber is provided with tubes and steam is generated. In that manner the energy content of the exhaust gas will be utilized to a high degree.

In accordance with a preferred feature the dust which has been collected from the exhaust gas from the rotary kiln is recycled to the kiln until individual components have become sufficiently enriched for a recovery of valuable substances after a withdrawal. That procedure will be adopted particularly if the mineral matter contains, e.g., non-ferrous metals, such as Pb and Zn, which are volatilized in part and which can be recovered by the above treatment.

The invention will be explained more in detail with reference to an example.

A countercurrent-heated rotary kiln having a length of 12 meters and a masonry diameter of 0.8 m was charged at a rate of 600 kg/h with a mixture of contaminated substances. The rotary kiln was operated at an inclination of 2° and at a speed of 0.6 r.p.m. The kiln was heated by an oil-fired central burner disposed at the discharge end of the kiln.

The mixture of materials that was charged to the rotary kiln contained 15% moisture, or an average, and on a dry basis contained:

| | |
|---|---|
| 48.1% | $SiO_2$ |
| 11.6% | $Al_2O_3$ |
| 11.8% | CaO |
| 2.0% | MgO |
| 8.0% | C |
| 3.2% | organic components |
| 1.9% | Zn + Pb |
| 0.8% | Cu + Ni |
| 0.3% | Cr |
| 1.5% | Cl |
| 0.5% | F |
| 2.0% | S |

The main components $SiO_2$, $Al_2O_3$, CaO and MgO, which constituted the matrix of the slag phase, amounted to 73.5% on a dry basis. The matrix contained 65.5% $SiO_2$, 15.8% $Al_2O_3$, 16% CaO and 2.7% MgO.

The material discharged from the rotary kiln was at a temperature up to 1320° C. and constituted a slag, which was fed into a water bath and was removed from said bath by means of a drag conveyor. Those heavy metals which had not been volatilized were virtually completely embedded in and enclosed by mineral matter in the slag so that they could not be leached.

The exhaust gas was afterburnt at about 1150° C. in an afterburning chamber, which succeeded the exhaust gas outlet of the rotary kiln, and was purified by conventional methods. The dust contained 10.5% Zn+Pb and was added to the mixture to be charged to the kiln. After a repeated recirculation the dust containing more than 25% Zn+Pb was removed from circulation and delivered to a zink smelter.

The advantages afforded by the invention reside in that the polluants contained in the mineral substances can be transformed in part to harmless substances by a combustion and the remaining polluants are so enclosed and immobilized in the resulting slag phase that the slag can be dumped without difficulty or can be used for various purposes, such as land fill, the construction of roads and dams, for gob filling, etc.

I claim:

1. A method of processing contaminated mineral substances by a thermal treatment in a rotary kiln, characterized in that the thermal treatment is effected at a temperature at which the charge of the rotary kiln is transformed to a (pasty doughlike) to liquid slag phase, and the composition of the charge is so selected that a slag phase is produced in which the main components, which constitute a matrix, are in the range from 60 to 72% $SiO_2$, 10 to 30% $Al_2O_3$ and 5 to 25% CaO+MgO of said matrix, wherein the total percentage of $SiO_2$+$Al_2O_3$+CaO+MgO equals 100, the total of the main components $SiO_2$, $Al_2O_3$, CaO and MgO amounts to more than 60%, on a dry and ignition loss-free basis, of the mineral matter which is charged to the rotary kiln, the slag phase discharged from the rotary kiln is cooled and the exhaust gas from the rotary kiln is purified.

2. A method according to claim 1, characterized in that the total of the main components $SiO_2$, $Al_2O_3$, CaO and MgO amounts to at least 70%, on a dry and ignition loss-free basis, of the mineral matter which is charged to the rotary kiln.

3. A process according to claim 1 characterized in that the charge is heated in the rotary kiln to a temperature between 1150° and 1400° C.

4. A method according to claim 1 characterized in that the substances to be charged to the rotary kiln have particle sizes up to 10 mm, preferably up to 5 mm.

5. A method according to claim 1 characterized in that carbon-containing substances which can be dumped only with difficulty are used as energy sources.

6. A method according to claim 1 characterized in that the hot slag is sprayed with water in a cooling drum or is introduced into a water bath and a slag sand-like product is produced.

7. A method according to claim 1 characterized in that the hot slag is fed onto a slag belt conveyor and slag bricks are produced.

8. A method according to claim 1 characterized in that a controlled combustion of the exhaust gas from the rotary kiln is effected in an afterburning chamber which succeeds the exhaust gas outlet of the rotary kiln.

9. A method according to claim 1 characterized in that the afterburning chamber is provided with tubes and steam is generated.

10. A method according to claim 1 characterized in that the dust which has been collected from the exhaust gas from the rotary kiln is recycled to the kiln until individual components have become sufficiently enriched for a recovery of valuable substances after a withdrawal.

* * * * *